(12) United States Patent
Cheng

(10) Patent No.: US 10,686,921 B2
(45) Date of Patent: Jun. 16, 2020

(54) TERMINAL DISPLAY ASSEMBLY AND MOBILE TERMINAL

(71) Applicant: GUANGDONG OPPO MOBILE TELECOMMUNICATIONS CORP., LTD., Dongguan, Guangdong (CN)

(72) Inventor: Jiao Cheng, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/385,429

(22) Filed: Apr. 16, 2019

(65) Prior Publication Data

US 2019/0335026 A1    Oct. 31, 2019

(30) Foreign Application Priority Data

Apr. 26, 2018    (CN) .................... 2018 2 0617852 U

(51) Int. Cl.
*H04W 4/00* (2018.01)
*H04M 1/02* (2006.01)
*H04M 1/03* (2006.01)

(52) U.S. Cl.
CPC ....... *H04M 1/0266* (2013.01); *H04M 1/0264* (2013.01); *H04M 1/03* (2013.01)

(58) Field of Classification Search
CPC .................................................. H04M 1/0264
See application file for complete search history.

(56) References Cited

U.S. PATENT DOCUMENTS

| | | | | |
|---|---|---|---|---|
| 2007/0103069 | A1* | 5/2007 | Manuela ................ | H05B 33/04 313/512 |
| 2011/0255000 | A1 | 10/2011 | Weber et al. | |
| 2013/0294020 | A1* | 11/2013 | Rayner .................. | H05K 5/061 361/679.01 |
| 2015/0369734 | A1 | 12/2015 | Shih et al. | |
| 2017/0287992 | A1* | 10/2017 | Kwak ................ | H04M 1/0264 |
| 2018/0262602 | A1 | 9/2018 | Zhang | |
| 2019/0320050 | A1* | 10/2019 | Lim ........................ | H04R 1/02 |

FOREIGN PATENT DOCUMENTS

| | | |
|---|---|---|
| CN | 206226512 U | 6/2017 |
| CN | 106936954 A | 7/2017 |
| CN | 107707695 A | 2/2018 |
| CN | 107809507 A | 3/2018 |

(Continued)

OTHER PUBLICATIONS

International search report, PCT/CN2019/083958, dated Jul. 1, 2019.
European search report, EP19170563.1, dated Sep. 5, 2019.

*Primary Examiner* — Omoniyi Obayanju

(57) ABSTRACT

A terminal display assembly may include a display screen, a light-transmission cover plate, optical means and a seal ring. The display screen may define a through hole penetrating the display screen in a thickness direction of the display screen. The light-transmission cover plate may be disposed on the display screen and cover the through hole. A least part of the optical means may be disposed in the through hole. The seal ring may be disposed on the optical means, sandwiched between the optical means and the light-transmission cover plate, and contact with the light transmission cover plate.

20 Claims, 10 Drawing Sheets

(56) References Cited

FOREIGN PATENT DOCUMENTS

| | | |
|---|---:|---:|
| CN | 207123683 U | 3/2018 |
| CN | 208158661 U | 11/2018 |
| EP | 2065783 A1 | 6/2009 |
| EP | 3226101 A1 | 10/2017 |
| WO | WO2012086034 A1 | 6/2012 |

\* cited by examiner

US 10,686,921 B2

TERMINAL DISPLAY ASSEMBLY AND MOBILE TERMINAL

CROSS-REFERENCE TO RELATED APPLICATIONS

This application claims priority to Chinese Patent Application No. 201820617852.9, filed on Apr. 26, 2018, the contents of which are herein incorporated by reference in their entireties.

TECHNICAL FIELD

The present disclosure relates to the terminal technologies, and more particularly to a terminal display assembly and a mobile terminal.

BACKGROUND

With the development of communication technologies, mobile terminals such as smart phones are getting more and more popular. In the process of using mobile terminal, more and more functions such as photographing, chatting and playing games can be achieved by the mobile terminal, so that more and more components are internally mounted in the terminal, especially more and more components are disposed on a face of the mobile terminal where a screen is mounted on. In this case, when the size of the mobile terminal remains unchanged, display area of the display screen tends to be sacrificed and reduced.

SUMMARY OF THE DISCLOSURE

An embodiment of the present disclosure provides a terminal display assembly, the terminal display assembly may include a display screen, a light transmission, an optical means and a seal ring. The display screen may define a through hole penetrating the display screen in a thickness direction of the display screen. The light-transmission cover plate may be disposed on the display screen and cover the through hole. At least part of the optical means may be disposed in the through hole. The seal ring may be disposed on the optical means, sandwiched between the optical means and the light-transmission cover plate, and contacting with the light-transmission cover plate.

An embodiment of the present disclosure further provides a mobile terminal, the mobile terminal may include a housing and the above terminal display assembly.

An embodiment of the present disclosure further provides a terminal display assembly, the terminal display assembly may include a display screen, a light transmission, an optical means and a seal ring. The display screen may define a through hole penetrating the display screen in a thickness direction of the display screen. The light-transmission cover plate may be disposed on the display screen and cover the through hole. At least part of the optical means may be disposed in the through hole. The seal ring may be disposed on the optical means, at least part of the seal ring may be sandwiched between the optical means and the light-transmission cover plate.

BRIEF DESCRIPTION OF THE DRAWINGS

In order to more clearly illustrate technical solutions of the embodiments of the present disclosure, the drawings required to be used in the description of the embodiments will be briefly described below. Evidently, the drawings in the following description are only some embodiments of the present disclosure, and according to these drawings, those skilled in the art may obtain other drawings without any creative work.

DETAILED DESCRIPTION

Figure 1:
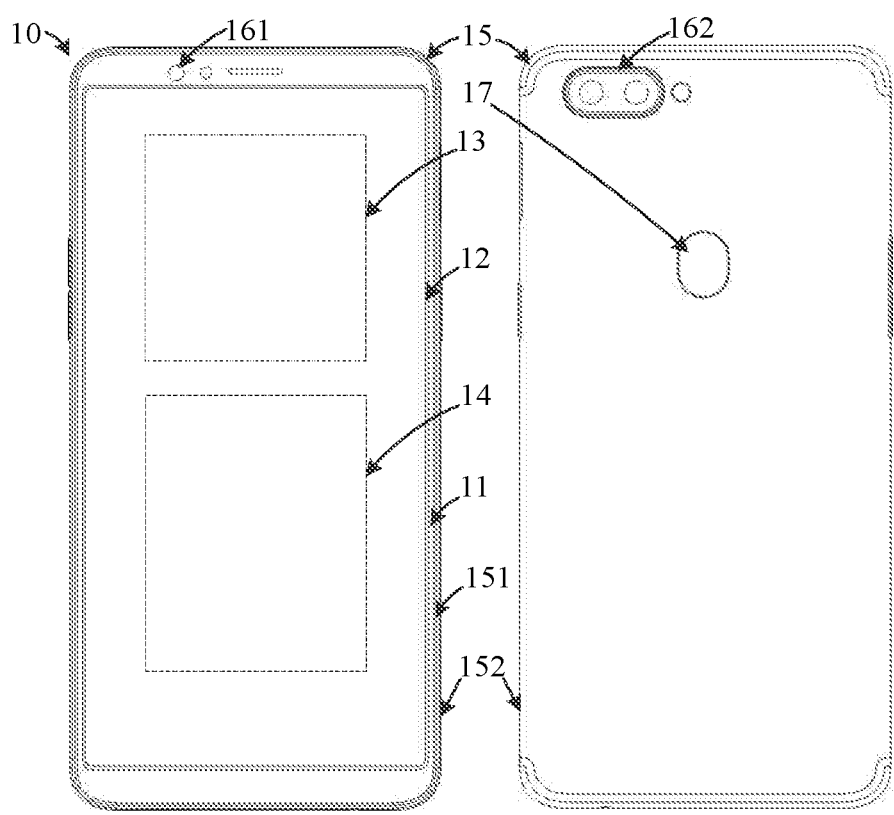
FIG. 1 is a structural diagram of a mobile terminal according to an embodiment of the present disclosure.

The detailed description set forth below is intended as a description of the subject technology with reference to the appended figures and embodiments. It is understood that the embodiments described herein include merely some parts of the embodiments of the present disclosure, but do not include all the embodiments. Based on the embodiments of the present disclosure, all other embodiments that those skilled in the art may derive from these embodiments are within the scope of the present disclosure.

In the description of the present disclosure, it is to be understood that terms such as "center", "longitudinal", "lateral", "length", "width", "thickness", "upper", "lower", "front", "rear", "left", "right", "vertical", "horizontal", "top", "bottom", "inner", "outer", "clockwise", "counterclockwise", and the like, refer to the orientations and locational relations illustrated in the accompanying drawings. Thus, these terms used here are only for describing the present disclosure and for describing in a simple manner, and are not intended to indicate or imply that the device or the elements are disposed to locate at the specific directions or are structured and performed in the specific directions, which could not to be understood as limiting the present disclosure. In addition, terms such as "first", "second", and the like are used herein for purposes of description, and are not intended to indicate or imply relative importance or significance or to imply the number of indicated technical features. Thus, the feature defined with "first", "second", and the like may include one or more of such a feature. In the description of the present disclosure, "a plurality of" means two or more, such as two, three, and the like, unless specified otherwise.

In the present disclosure, unless specified or limited, otherwise, terms "mounted", "connected", "coupled", and the like are used in a broad sense, and may include, for example, fixed connections, detachable connections, or integral connections; may also be mechanical or electrical connections; may also be direct connections or indirect connections via intervening structures; may also be inner communications of two elements, as can be understood by one skilled in the art depending on specific contexts.

The following disclosure provides many different embodiments or examples for implementing different structures of the present disclosure. In order to simplify the present disclosure, components and settings of the specific examples are described below. Of course, embodiments are merely examples and are not intended to limit the present disclosure. In addition, the present disclosure may repeat reference numerals and/or reference numerals in different examples, which are for the purpose of simplicity and clarity, and do not in themselves indicate the relationship between the various embodiments and/or arrangements discussed. Moreover, the present disclosure provides examples of various specific processes and materials, but one of ordinary skill in the art will recognize the use of other processes and/or the use of other materials.

In the present disclosure, "communication terminals" (or short as "terminals") include, but are not limited to, devices configured to receive/transmit communication signals via wire line connection (for example, via a public switched telephone network (PSTN), digital subscriber line (DSL), digital cable, direct cable connection, and/or another data connection/network) and/or via wireless interface (for example, directed to a cellular network, a wireless local area network (WLAN), a digital television network such as a DVB-H network, a satellite network, an AM-FM broadcast transmitter, and/or another communication terminal). Communication terminals configured to communicate via wireless interface may be referred to as "wireless communication terminals", "wireless terminals" or "mobile terminals". Examples of mobile terminals include, but are not limited to, satellites or cellular telephones; personal communication system (PCS) terminals which can combine cellular radiotelephone with capabilities of data processing, faxing and data communication; PDAs which can include radiotelephones, pagers, Internet/Intranet access, Web browsers, notebooks, calendars, and/or global positioning system (GPS) receivers; and conventional lap and/or palm receivers or other electronic devices including radiophone transceivers.

The embodiments of the present disclosure provide a terminal display assembly and a mobile terminal, which will be detailed separately below. Therein, the terminal display assembly may be provided in the mobile terminal. The mobile terminal may be a smart phone, a tablet computer or the like.

In some embodiments, a terminal display assembly may include: a display screen, a light-transmission cover plate and an optical means. The display screen may define a through hole penetrating the display screen in a thickness direction of the display screen. The light-transmission cover plate may be disposed on the display screen and cover the through hole. At least part of the optical means may be disposed in the through hole. The seal ring may be disposed on the optical means, sandwiched between the optical means and the light-transmission cover plate, and contact with the light-transmission cover plate.

In some embodiments, the seal ring may be made of a silica gel material; the seal ring may be heated and pressed on the optical means, or the seal ring may be adhered to the optical means by glue.

In some embodiments, the seal ring may include a top and a bottom opposite to the top, the top of the seal ring may be disposed on the optical means.

In some embodiments, a width of the seal ring may be gradually increased from the bottom to the top.

In some embodiments, the seal ring may further include an outer wall and an inner wall away from a sidewall of the display screen in the through hole and disposed opposite to the outer wall of the seal ring; a placement stand may be formed on the top, the placement stand may be recessed from the top of the seal ring towards the bottom of the seal ring, and further connected to the inner wall.

In some embodiments, the seal ring may be in shape of a circular annulus, and an inner diameter of the seal ring may be gradually increased in a direction from the bottom to the top.

In some embodiments, the light-transmission cover plate may be fixed on the display screen via an optical adhesive, a thickness of the seal ring may be greater than or equal to a thickness of the optical adhesive.

In some embodiments, optical means may include a camera member having a base and a lens, the lens may be disposed on the base and further received in the through hole, the seal ring may be disposed on the lens.

In some embodiments, the lens may include an end face away from the base, the seal ring may be disposed on the end face of the lens away from the base.

In some embodiments, the seal ring may be disposed on a periphery of the end face.

In some embodiments, a mobile terminal may include a housing and a first terminal display assembly disposed in the housing. The first terminal display assembly may include a display screen, a light-transmission cover plate, an optical means and a seal ring. The display screen may define a through hole penetrating the display screen in a thickness direction of the display screen. The light-transmission cover plate may be disposed on the display screen and cover the through hole. At least part of the optical means may be disposed in the through hole. The seal ring may be disposed on the optical means, sandwiched between the optical means and the light-transmission cover plate, and contact with the light-transmission cover plate.

In some embodiments, the mobile terminal may further include a second terminal display assembly disposed on the housing, the first terminal display assembly may be disposed on a face of the housing, and the second terminal display assembly may be disposed on an opposite face of the housing.

In some embodiments, a display area of the second terminal display assembly may be greater than that of the first terminal display assembly.

In some embodiments, the seal ring may be made of a silica gel material; the seal ring may be heated and pressed on the optical means, or the seal ring may be adhered to the optical means by glue.

In some embodiments, the seal ring may include a top and a bottom opposite to the top, the top of the seal ring is disposed on the optical means.

In some embodiments, a width of the seal ring may be gradually increased from the bottom to the top.

In some embodiments, the seal ring may further include an outer wall, and an inner wall away from a sidewall of the display screen in the through hole and disposed opposite to the outer wall of the seal ring; a placement stand may be form on the top, the placement stand may be recessed from the top of the seal ring towards the bottom of the seal ring, and further connected to the inner wall.

In some embodiments, the seal ring may be in shape of a circular annulus, and an inner diameter of the seal ring may be gradually increased in a direction from the bottom to the top.

In some embodiments, the light-transmission cover plate may be fixed on the display screen via an optical adhesive, a thickness of the seal ring may be greater than or equal to a thickness of the optical adhesive.

In some embodiments, a terminal display assembly may include a display screen, a light-transmission cover plate, an optical means. The display screen may define a through hole penetrating the display screen in a thickness direction of the display screen. The light-transmission cover plate may be disposed on the display screen and cover the through hole. At least part of the optical means may be disposed in the through hole. The seal ring may be disposed on the optical means, at least part of the seal ring may be sandwiched between the optical means and the light-transmission cover plate.

In some embodiments, the camera module may further include a connection circuit disposed on the base.

In some embodiments, the seal ring may be made of a foam cotton material.

In some embodiments, the terminal display assembly may be a secondary terminal display assembly of the mobile terminal, the mobile terminal may include a primary terminal display assembly disposed on the housing, a display area of the primary terminal display assembly may be larger than that of the secondary terminal display assembly, the primary terminal display assembly and the secondary terminal display assembly may be disposed on opposite faces of the housing respectively.

In some embodiments, the terminal display assembly may be a primary terminal display assembly of the mobile terminal, the mobile terminal may include a secondary terminal display assembly disposed on the housing, a display area of the primary terminal display assembly may be larger than that of the secondary terminal display assembly, the primary terminal display assembly and the secondary terminal display assembly may be disposed on opposite faces of the housing respectively.

FIG. 1 shows a structural diagram of a mobile terminal according to an embodiment of the present disclosure. As shown in FIG. 1, a mobile terminal 10 may include a light-transmission cover plate 11, a display screen 12, a control circuit 13, a battery 14, a housing 15, a front camera 161, a rear camera 162, and a fingerprint unlocking member 17. It should be noted that the mobile terminal 10 is not limited to the above contents.

The light-transmission cover plate 11 may be mounted on the display screen 12 to cover the display screen 12. The light-transmission cover plate 11 can be a transparent glass cover plate such that the display screen can display through the light-transmission cover plate 11. In some embodiments, the light-transmission cover plate 11 can be a glass cover plate made of material such as sapphire.

The display screen 12 may be mounted in the housing 15. The display screen 12 may be electrically connected to the control circuit 13 to form a display surface of the electronic device 10. The display screen 12 may have a regular shape, such as a cuboid structure. A top or/and a bottom of the electronic device 10 may form a non-display area, that is, the electronic device 10 may form a non-display area on an upper or a lower portion of the display screen 12, and means such as a front camera 161 and a rear camera 162 may be mounted in the non-display area of the electronic device 10.

The control circuit 13 may be mounted in the housing 15. The control circuit 13 may be a mainboard of the electronic device 10. The control circuit 13 can be integrated with one, two or more of functional components such as a motor, a microphone, a speaker, a headphone interface, a universal serial bus interface, a front camera 161, a rear camera 162, a distance sensor, an ambient light sensor, a receiver, and a processor, and the like.

In some embodiments, the control circuit 13 may be fixed within the housing 15. Specifically, the control circuit 13 may be screwed to a middle frame 151 by screws, or can be snapped onto the middle frame 151 by means of a buckle. It should be noted that specific manners in which the circuit board 13 is fixed to the middle frame 151 in the embodiment of the present disclosure are not limited thereto, and may also adopt other manners, for example, a manner of fixing by means of both the buckle and the screws.

The battery 14 may be mounted within the housing 15 and electrically connected to the circuit board 13 to provide electrical power to the electronic device 10. The housing 15 can be used as a battery cover of the battery 14. The housing 15 can cover the battery 14 to protect the battery 14, thereby reducing damage to the battery 14 due to collision and falling of the electronic device 10.

The housing 15 may form an outer contour of the electronic device 10. In some embodiments, the housing 15 may include a middle frame 151 and a rear cover 152. The middle frame 151 and the rear cover 152 can be combined with each other to form the housing 15. The middle frame 151 and the rear cover 152 may form a receiving space for receiving the display screen 12, the circuit board 13, the battery 14, and the like. The light-transmission cover plate 11 can be fixed to the housing 15. The light-transmission cover plate 11 may cover the middle frame 151. The rear cover 152 may cover the middle frame 151. The light-transmission cover plate 11 and the rear cover 152 may be respectively located on opposite faces of the middle frame 151. The light-transmission cover plate 11 and the rear cover 152 may be disposed opposite to each other.

In some embodiments, the housing 15 can be a metal housing, for example, the housing 15 may be made of magnesium alloy, stainless steel, or the like. It should be noted that the material of the housing 15 according to the embodiments of the present disclosure is not limited thereto, and may also adopt other manners. For example, the housing 15 can be a plastic housing. For another example, the housing 15 may be a ceramic housing. For still another example, the housing 15 may include a plastic portion and a metal portion, and the housing 15 may be a housing combing metal with plastic. Specifically, the metal portion may be formed first, for example, a magnesium alloy substrate may be formed by injection molding, and plastic may be then injected onto the magnesium alloy substrate to form a plastic substrate, thereby forming an integral housing structure. It should be noted that the material and process of the housing 15 are not limited thereto, and the housing may also be a glass housing.

It should be noted that the structure of the housing 15 according to the embodiments of the present disclosure is not limited thereto. For example, the rear cover 152 and the middle frame 151 can be integrally with each other to form an integral housing 15, which may directly have a receiving space for receiving the display screen 12, the control circuit 13, the battery 14, and the like.

Figure 2:
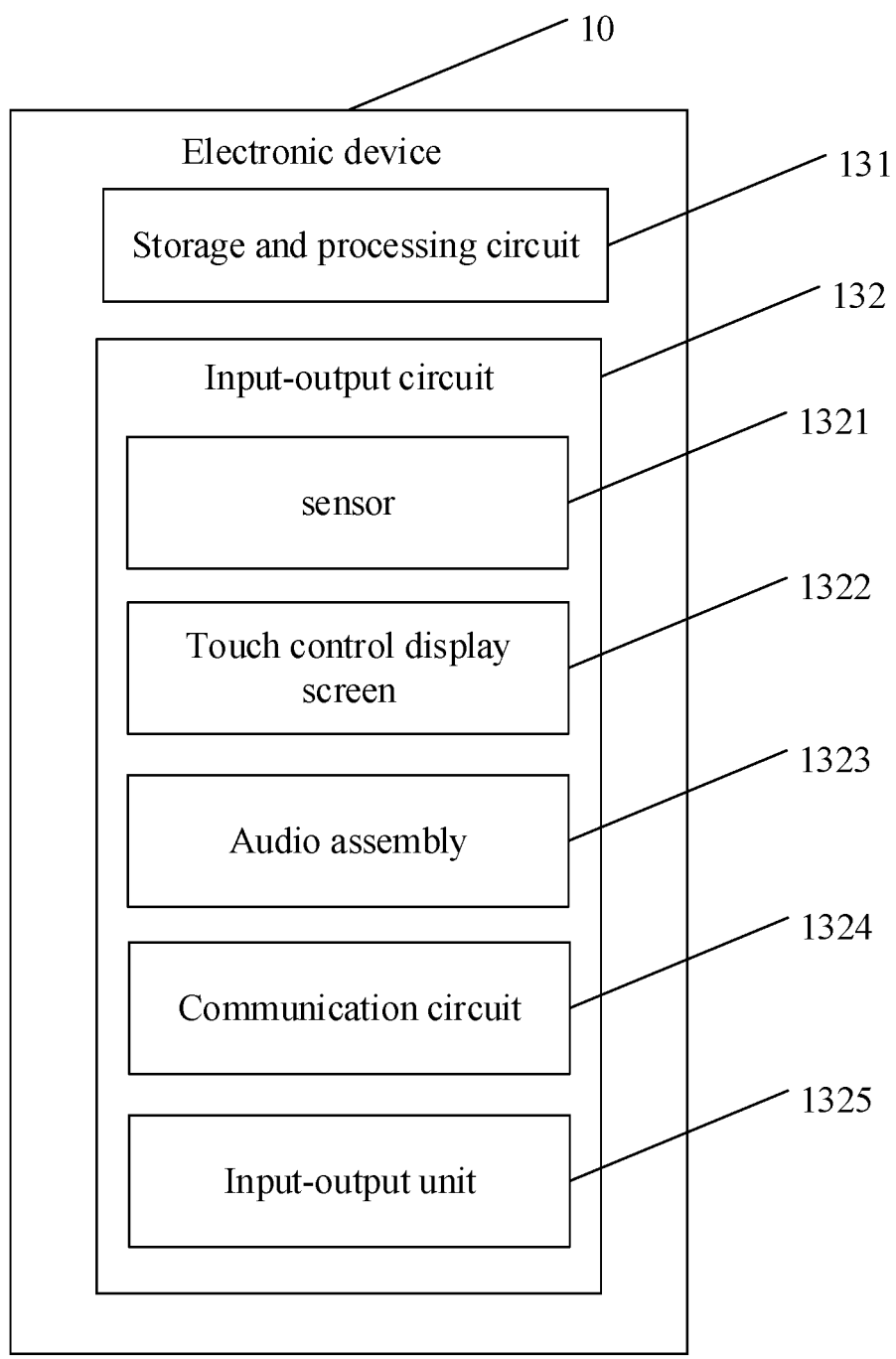
FIG. 2 is a block diagram of an electronic device according to an embodiment of the present disclosure.

FIG. 2 is a block diagram of an electronic device according to an embodiment of the present disclosure. As shown in FIG. 2, the control circuit 13 of the electronic device 10 may include a storage and processing circuit 131. The storage and processing circuit 131 may include a memory, such as a hard disk drive memory, a non-volatile memory (such as a flash memory or other electronically programmable read-only memory used to form a solid state driver, etc.), a volatile memory (such as static or dynamic random access memory), and the like, with no limitation set in embodiments of the present disclosure. A processing circuit of the storage and processing circuit 131 may be used to control operations of the electronic device 10. The processing circuit may be implemented based on one or more microprocessors, microcontrollers, digital signal processors, baseband processors, power management units, audio codec chips, application specific integrated circuits, display driver integrated circuits, and the like.

The storage and processing circuit 131 can be used to operate software of the electronic device 10, such as an Internet browsing application program, a voice over Internet protocol (VOIP) telephone call application program, an email application program, a media play application program, an operating system function, etc. Those software may be used to perform some control operations, such as image acquisition based on camera, ambient light measurement based on ambient light sensor, proximity sensor measurement based on proximity sensor, information display function implemented by status indicators such as status indicator light of LED, touch event detection based on touch sensor, functions associated with displaying information on multiple (for example, layered) displays, operations associated with performing wireless communication functions, operations associated with collecting and generating audio signals, control operations associated with collecting and processing button press event data, and other functions of the electronic device 10, etc., with no limitation set in the embodiment of the present disclosure.

The electronic device 10 may further include an input-output circuit 132. The input-output circuit 132 may be used to enable the electronic device 10 to implement data input and output, i.e., to allow the electronic device 10 to receive data from an external device and also to allow the electronic device 10 to output data from the electronic device 10 to the external device. The input-output circuit 132 may further include a sensor 1321. The sensor 1321 may include an ambient light sensor, a light and capacitance based proximity sensor, a touch sensor (for example, a light based touch sensor and/or a capacitive touch sensor, where the touch sensor can be part of a touch control display screen, and can also be used independently as a touch sensor structure), acceleration sensors, and other sensors, etc.

The input-output circuit 132 may further include one or more displays, such as a display 1322 which may be referred to the display 12 described above. The display 1322 may include one of a liquid crystal display, an OLED display, an electronic ink display, a plasma display, and a display using other display technology, or combinations thereof. The display 1322 may include a touch sensor array (i.e., the display 1322 may be a touch control display screen). The touch sensor may be a capacitive touch sensor formed by an array of transparent touch sensor electrodes (for example, indium tin oxide (ITO) electrodes), or may be a touch sensor formed by using other touch technology, such as acoustic touch control, pressure-sensitive touch, resistance touch, and optical touch, etc., with no limitation set in the embodiment of the present disclosure.

The electronic device 10 may further include an audio assembly 1323. The audio assembly 1323 can be used to provide audio input and output functions for the electronic device 10. The audio assembly 1323 of the electronic device 10 may include a speaker, a microphone, a buzzer, a tone generator, and other components for generating and detecting sounds.

The electronic device 10 may also include a communication circuit 1324. The communication circuit 1324 can be used to provide the electronic device 10 with a capacity to communicate with external devices. The communication circuit 1324 may include an analog and digital input-output interface circuit, and a wireless communication circuit based on radio frequency signals and/or optical signals. The wireless communication circuit included in the communication circuit 1324 may include a radio frequency transceiver circuit, a power amplifier circuit, a low noise amplifier, a switch, a filter, and an antenna structure 19. For example, the wireless communication circuit included in the communication circuit 1324 may include a circuit for supporting Near Field Communication (NFC) by transmitting and receiving near field coupled electromagnetic signals. For example, the communication circuit 1324 may include a near field communication antenna and a near field communication transceiver. The communication circuit 1324 may also include a cellular telephone transceiver, a wireless local area network transceiver circuit, and the like.

The electronic device 10 may further include a power management circuit and an input-output unit 1325. The input-output unit 1325 may include a button, a control stick, a click wheel, a roll wheel, a touch board, a keypad, a keyboard, a camera, a LED, and other status indicator, etc.

The user may input commands through the input-output circuit 132 to control operation of the electronic device 10, and may use output data of the input-output circuit 132 to implement reception of status information and other outputs from the electronic device 10.

It should be noted that the structure of the display screen 12 is not limited thereto. For example, the display screen 12 may be an anomalous screen.

Figure 3:
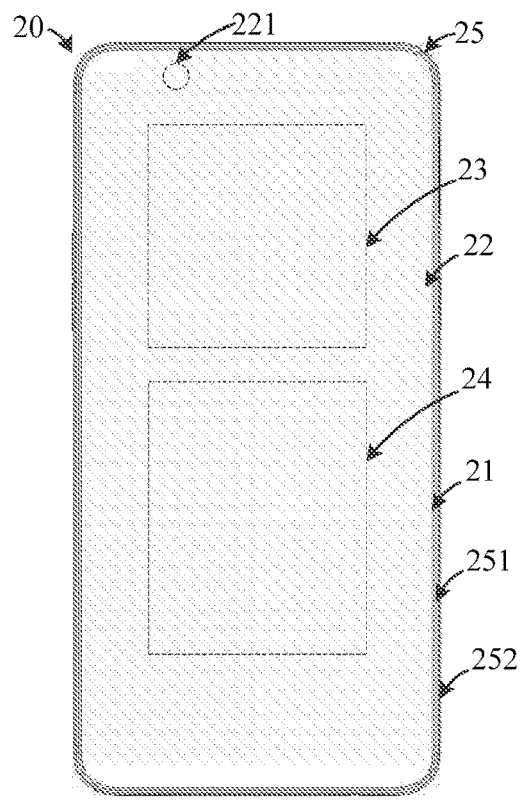
FIG. 3 is another structural diagram of a mobile terminal according to an embodiment of the present disclosure.

FIG. 3 is another structural diagram of a mobile terminal according to an embodiment of the present disclosure. As shown in FIG. 3, a mobile terminal 20 may include a light-transmission cover plate 21, a display screen 22, a control circuit 23, a battery 24, and a housing 25. The mobile terminal 20 may be different from the mobile terminal 10 in that the display screen 22 has a light-transmission area formed directly thereon. For example, the display screen 22 can be provided with a through hole 221 penetrating the display screen 22 in a thickness direction. That is, the light-transmission area can be the through hole 221, and a position of the through hole 221 may be provided with optical means such as a front camera, an earpiece, a sensor, and the like for facilitating signal transmission. The light-transmission cover plate 21 may cover the position of the through hole 221 or may be provided with a corresponding through hole.

In order to further describe the display screen 22 being provided with the through hole 221 to realize signal transmission according to the embodiment of the present disclosure in detail, a description will be given below from the perspective of a terminal display assembly.

Figure 4:
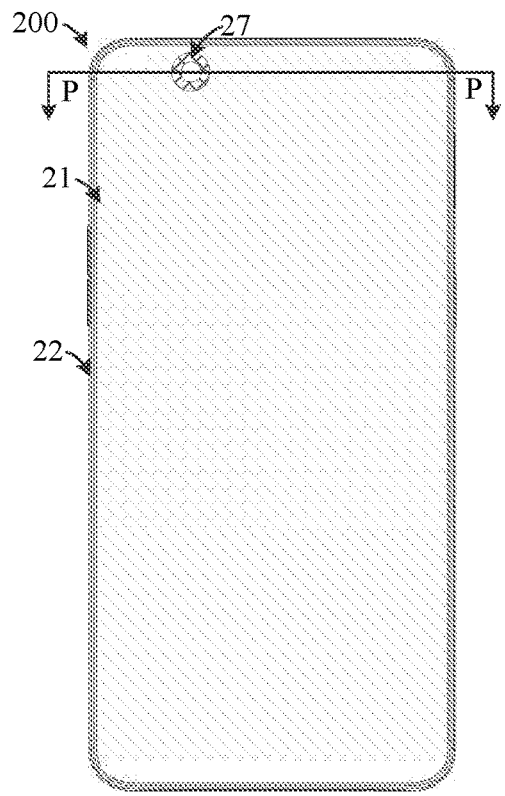
FIG. 4 is a structural diagram of a terminal display assembly according to an embodiment of the present disclosure.
Figure 5:
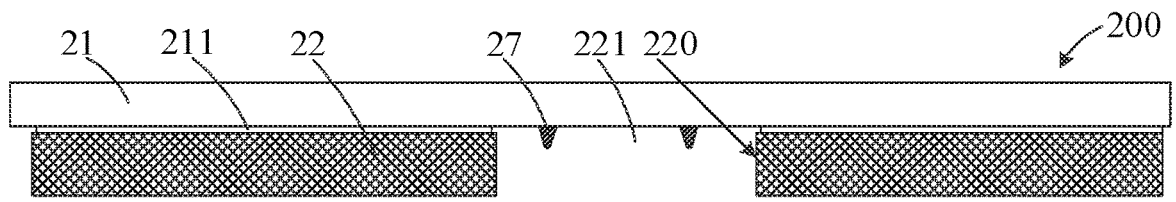
FIG. 5 is a cross-sectional diagram of the terminal display assembly of FIG. 4 in a P-P direction.

FIG. 4 is a structural diagram of a terminal display assembly according to an embodiment of the present disclosure. FIG. 5 is a cross-sectional diagram of the terminal display assembly of FIG. 4 in a P-P direction. As shown in FIGS. 4-5, a terminal display assembly 200 may include a light-transmission cover plate 21, a display screen 22, and a seal ring 27.

The light-transmission cover plate 21 can be a transparent glass cover plate, and may be fixed on the display screen 22 by optical adhesive 211. The light-transmission cover plate 21 may be disposed to cover the display screen 22, and cover the through hole 221 of the display screen 22.

The display screen 22 may define the through hole 221 penetrating the display screen 22 in a thickness direction thereof. Specifically, the display screen 22 may include a sidewall 220 shown in FIG. 5, the sidewall 220 may surround to define the through hole 221. The number of through holes 221 may be one, two or more. The through hole 221 can be adjacent to an edge of the display screen 22. For example, the through hole 221 may be adjacent to an end of the display screen 22. The through hole 221 can also be adjacent to other locations of the display screen 22, such as adjacent to a side of the display screen 22, adjacent to a corner position of the display screen 22, or located at a middle position of the display screen 22. The through hole 221 may be a circular hole or a rectangular hole. The through hole 221 may also have other shapes, for example, the through hole 221 may be an irregular hole.

Figure 6:
FIG. 6 is a cross-sectional diagram of a light-transmission cover plate of the terminal display assembly of FIG. 4 in the P-P direction.
Figure 7:
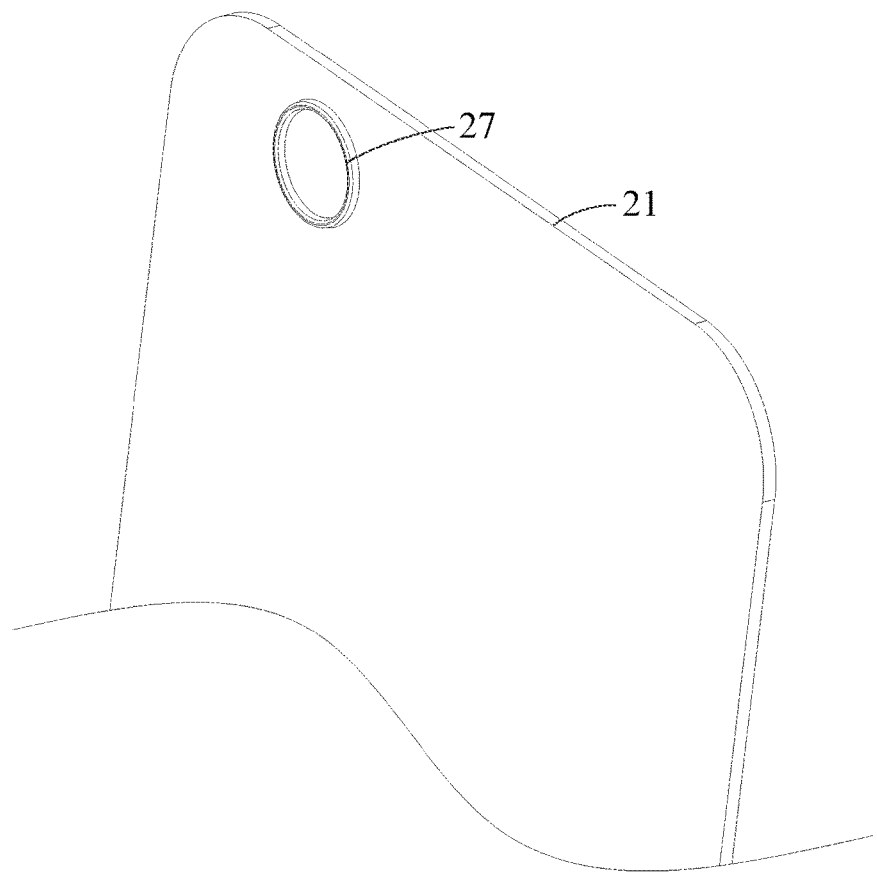
FIG. 7 is a stereogram of the light-transmission cover plate according to an embodiment of the present disclosure.

FIG. 6 is a cross-sectional diagram of the light-transmission cover plate in the terminal display assembly of FIG. 4 in the P-P direction. FIG. 7 is a stereogram of a light-transmission cover plate according to an embodiment of the present disclosure. As shown in FIGS. 6-7, the seal ring 27 may be disposed on the light-transmission cover plate 21, and located in the through hole 221. In some embodiments, the seal ring 27 may be made of a soft silica gel material, and may be fixed onto the light-transmission cover plate 21 by silica gel hot-press molding. The seal ring 27 may also be fixed onto the light-transmission cover plate 21 via glue adhesion.

It should be noted that the material of the seal ring 27 is not limited thereto, for example, the seal ring 27 can be made of a foam cotton material. It should further be noted that, in the actual production process, compared with the seal ring 27 made of a silica gel material, the seal ring 27 made of a foam cotton material may require a greater width and larger space. Moreover, as the diameter of the through hole 221 of the display screen 22 gets smaller, a sealing space gradually decreases, and space for receiving the seal ring 27 may be more limited. Compared with the seal ring 27 made of a foam cotton material, the seal ring 27 made of a silica gel material, may occupy less space to prevent dust and light leakage.

In some embodiments, a thickness of the seal ring 27 may be greater than or equal to a thickness of the optical adhesive 211, such that the seal ring 27 may have a light-shielding function, that is, the seal ring 27, surrounding the through hole 221, can prevent light rays of the display screen 22 from being transmitted to the through hole 221. Herein, the term "thickness" used here refers to a length of the component (such as the seal ring 27, the optical adhesive 211, and the like) in a direction from the light-transmission cover plate 21 to the display screen 22.

In some embodiments, the seal ring 27 may be a circular ring structure. More specifically, a transmission hole may be defined in a middle position of the seal ring 27; the transmission hole may be configured to transmit signals. It should be noted that the shape of the seal ring 27 is not limited thereto, for example, the shape of the seal ring 27 may be a hollow rectangular structure.

In some embodiments, a width of the seal ring 27 from a free end to a connecting end can gradually increase. It can be understood that the connecting end of the seal ring 27 is fixed on the light-transmission cover plate 21, and the free end of the seal ring 27 may be located at a top position of the seal ring 27 after the seal ring 27 is fixed on the light-transmission cover plate 21, the top position of the seal ring 27 can be referred to the top 271 shown in FIG. 17. It should be noted that the structure of the seal ring 27 is not limited thereto. Herein, the connecting end of the seal ring 27 may be configured to connected to the light-transmission cover plate 21, the free end may be opposite to the connecting end.

Figure 8:
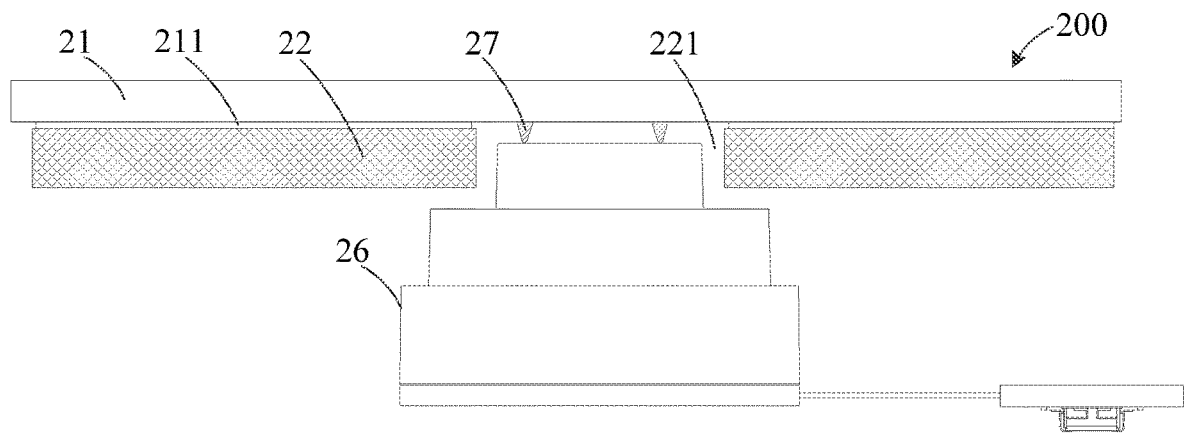
FIG. 8 is another cross-sectional diagram of the terminal display assembly of FIG. 4 in the P-P direction.
Figure 9:
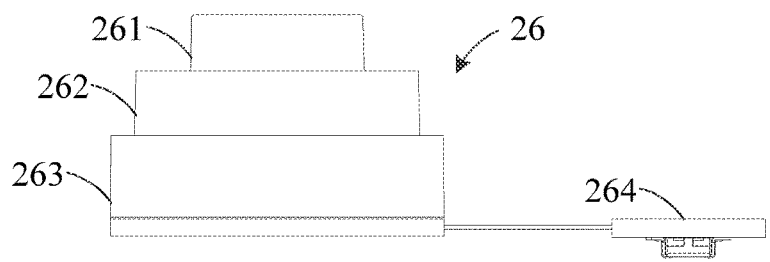
FIG. 9 is a structural diagram of an optical means according to an embodiment of the present disclosure.

In some embodiments, the seal ring 27 can be merely fixed on the light-transmission cover plate 21 and configured to be separated from the display screen 22. The seal ring 27 may be not in contact with the display screen 22, that is, a gap can be formed between the seal ring 27 and the display screen 22, and the gap may be a part of the through hole 221. FIG. 8 is another cross-sectional diagram of the terminal display assembly of FIG. 4 in the P-P direction, and FIG. 9 is a structural diagram of an optical means according to an embodiment of the present disclosure. As shown in FIGS. 8-9, the terminal display assembly 200 may further include an optical means 26 mounted at a position corresponding to the through hole 211, and at least part of the optical means 26 may be mounted in the through hole 221.

The optical means 26 may include a first optical component 261, a second optical component 262, and a third optical component 263. The first optical component 261 may be mounted on the third optical component 263 via the second optical component 262. The first optical component 261 may be mounted in the through hole 311. The second optical component 262 may be positioned by the housing 25 or the display screen 22. The third optical component 263 may mate with other components. It should be noted that, in some other embodiments, the optical means 26 may not include the third optical component 263, but only include the first optical component 261 and the second optical component 262, and the first optical component 261 may be directly mounted on the second optical component 262.

The optical means 26 may include a camera member exemplified by a camera. In some embodiments, the camera may include a lens, a connector, and a base. That is, the first optical component 261 may include a lens; the second optical component 262 may include a connector; and the third optical component 263 may include a base. The lens can be mounted on the base via the connector. It should be noted that, in some other embodiments, the camera may not include the connector or the base, and the lens can be directly mounted on the connector or the base.

At least part of the lens of the camera may be received in the through hole 221. After the lens of the camera is placed in the through hole 221, a periphery of the lens may be in contact with the seal ring 27, and the lens and the seal ring 27 abut against each other, such that the seal ring 27 can have a dust-proof function and prevent light rays of the display screen 22 from irradiating above the camera located at the position of the through hole 221, thereby avoiding affecting signal transmission of the camera due to the light rays of the display screen 22.

The camera may further include a connection circuit 264. The connection circuit 264 can be fixed on a control circuit 23, in order to achieve an electrical connection between the camera 26 and the control circuit 23. It should be noted that the camera 26 may also be directly integrated on the control circuit 23. The control circuit 23 may be mounted in the housing 25, and be electrically connected to a battery 24. The cover plate 21 may be disposed to cover the display screen 22, and cover the through hole 221. Therein, the housing 25 may be referred to the housing 15 described above; the control circuit 23 may be referred to the control circuit 13 described above; and the battery 24 may be referred to the battery 14 described above, which will not be described in details herein.

It can be learned from the above that the camera 26 according to the embodiment of the present disclosure can realize photographing and video-recording through the through hole 221, without needing to additionally provide a camera on the mobile terminal 20.

Figure 10:
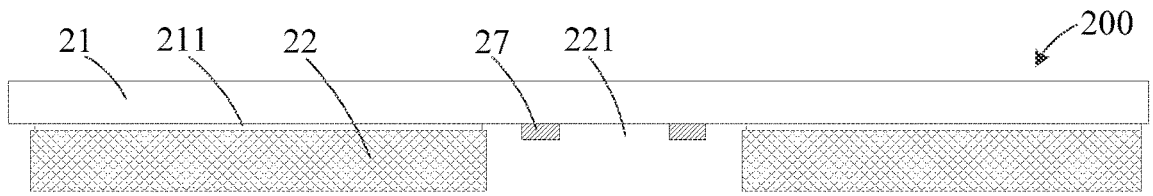
FIG. 10 is another cross-sectional diagram of the terminal display assembly of FIG. 4 in the P-P direction.
Figure 11:
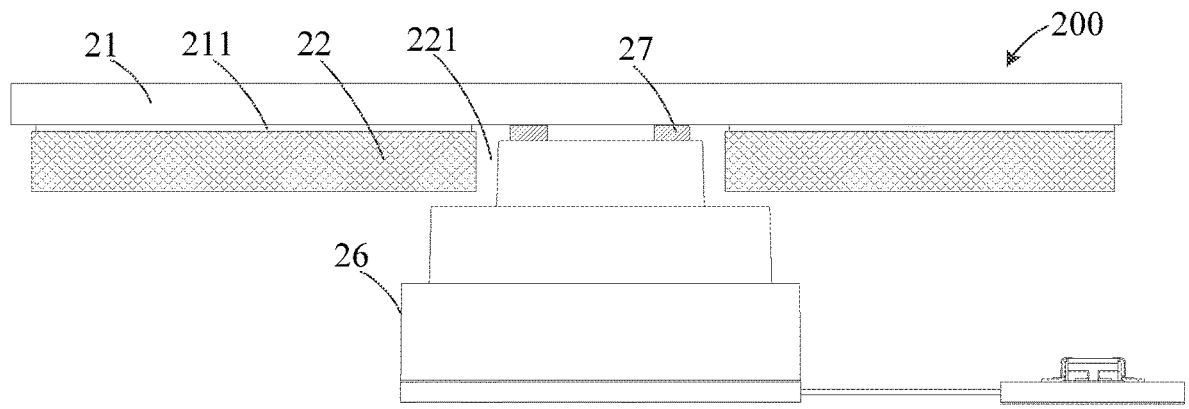
FIG. 11 is another cross-sectional diagram of the terminal display assembly of FIG. 4 in the P-P direction.
Figure 12:
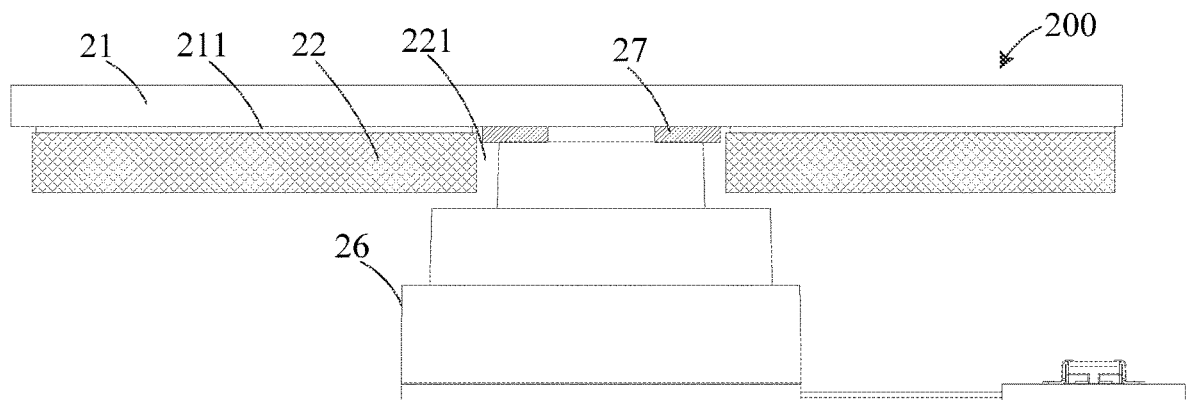
FIG. 12 is another cross-sectional diagram of the terminal display assembly of FIG. 4 in the P-P direction.

FIG. 10 is another cross-sectional diagram of the terminal display assembly of FIG. 4 in the P-P direction. As shown in FIG. 10, the width of the seal ring 27 from the free end to the connecting end remains unchanged. It should be noted that, when the camera is mounted in the through hole 221, an outer diameter of the lens of the camera can be greater than or equal to that of the seal ring 27, as specifically shown in FIG. 11 which is another cross-sectional diagram of the terminal display assembly in the P-P direction. It should be further noted that, when the camera is mounted within the through hole 221, the outer diameter of the lens of the camera can be smaller than that of the seal ring 27, as specifically shown in FIG. 12 which is another cross-sectional diagram of the terminal display assembly in the P-P direction.

In the embodiments of the present disclosure described above, the display screen 22 can define the through hole 221 and the light-transmission cover plate 21 can be provided with the seal ring 27 to achieve dust-proof and light-shielding effects. It should be noted that, the seal ring 27 may also achieve the dust-proof and light-shielding effects in other ways, and the ways are not limited thereto.

Figure 13:
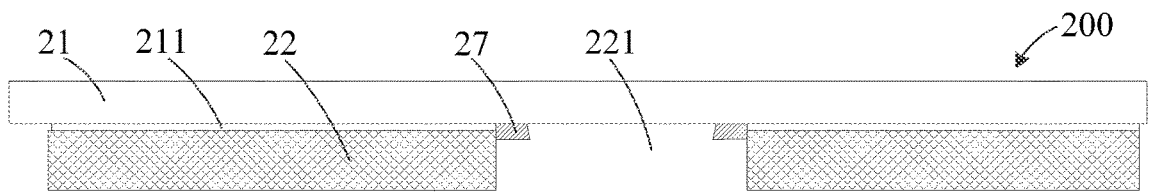
FIG. 13 is another cross-sectional diagram of the terminal display assembly of FIG. 4 in the P-P direction.

FIG. 13 is another cross-sectional diagram of the terminal display assembly of FIG. 4 in the P-P direction. The terminal display assembly 200 shown in FIG. 13 is different from the terminal display assembly 200 shown in FIG. 5 in that, the seal ring 27 of the terminal display assembly 200 shown in FIG. 13 can be connected to the display screen 22 and the light-transmission cover plate 21, respectively.

Specifically, a bottom of the seal ring 27 may be disposed on the light-transmission cover plate 21, and an outer wall of the seal ring 27 may be disposed on the display screen 22. Likewise, the seal ring 27 may be fixed on the light-transmission cover plate 21 and the display screen 22 by means of hot-press molding, and the seal ring 27 may also be fixed on the light-transmission cover plate 21 and the display screen 22 by means of glue adhesion.

It should be noted that manners in which the seal ring 27 is disposed between the display screen 22 and the light-transmission cover plate 21 are not limited thereto.

Figure 14:
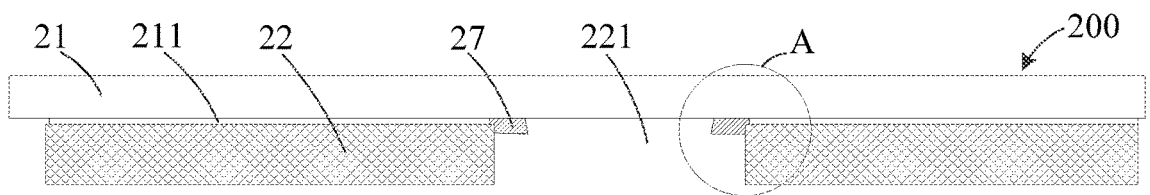
FIG. 14 is another cross-sectional diagram of the terminal display assembly of FIG. 4 in the P-P direction.
Figure 15:
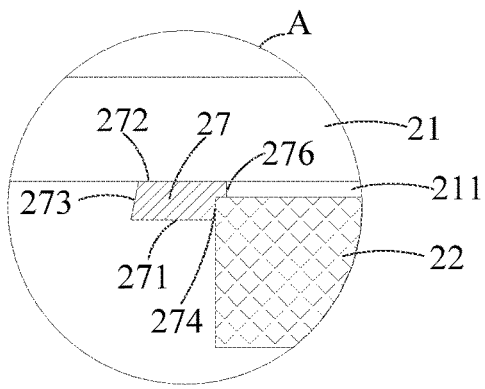
FIG. 15 is a partially enlarged diagram of the terminal display assembly of FIG. 14 at A position.

FIG. 14 is another cross-sectional diagram of the terminal display assembly of FIG. 4 in the P-P direction. FIG. 15 is a partially enlarged diagram of the terminal display assembly of FIG. 14 at A position. As shown in FIGS. 14-15, in some embodiments a part of the seal ring 27 may sandwiched between the light-transmission cover plate 21 and display screen 22. The seal ring 27 may include an extension 276, and the extension 276 may be located at a lateral side of the outer wall 274 of the seal ring 27 and extend in a direction from an inner wall 273 of the seal ring 27 toward the outer wall 274 of the seal ring 27. The extension 276 may extend into between the display screen 22 and the light-transmission cover plate 21. Specifically, the extension 276 may be connected to the optical adhesive 211.

In some embodiments, a thickness of the extension 276 can be equal to that of the optical adhesive 211, thereby avoiding affecting connection between the display screen 22 and the light-transmission cover plate 21 due to the setting of the extension 276.

It should be noted that the seal ring 27 may have a top 271, a bottom 272, the inner wall 273, and the outer wall 274. Therein, the top 271 and the bottom 272 may be disposed opposite to each other, and the inner wall 273 and the outer wall 274 may be disposed opposite to each other. Therein, the bottom 272 and the light-transmission cover plate 21 may be fixedly connected to each other, and the outer wall 274 and the display screen 22 may be fixed on each other. The inner wall 273 may be opposite to outer wall 274, and the top 271 may be opposite to the bottom 272. In some embodiments, a diameter of the inner wall 273 in a direction from the bottom 272 of the seal ring 27 to the top 271 of the seal ring 27 may be gradually decreased. In some embodiments, the free end of the seal ring 27 may be located at the top 271, and the connecting end of the seal ring 27 may be located at the bottom 272.

As can be learned from the above, the extension 276 may achieve light-shielding and dust-proof effects at a position between the light-transmission cover plate 21 and the display screen 22, and the light-shielding and dust-proof effects achieved by the extension 276 is better than those achieved only by the seal ring 27 at the through hole 221 without the extension 276. Moreover, the thickness of the extension 276 may be the same as that of the optical adhesive 211. In this way, an overall thickness of the terminal display assembly 200 may not be affected.

Figure 16:
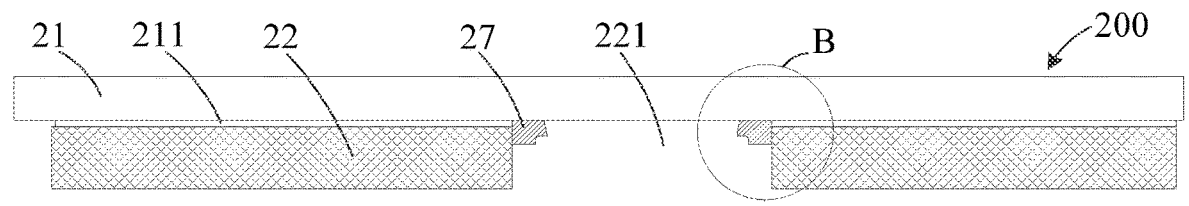
FIG. 16 is another cross-sectional diagram of the terminal display assembly of FIG. 4 in the P-P direction.
Figure 17:
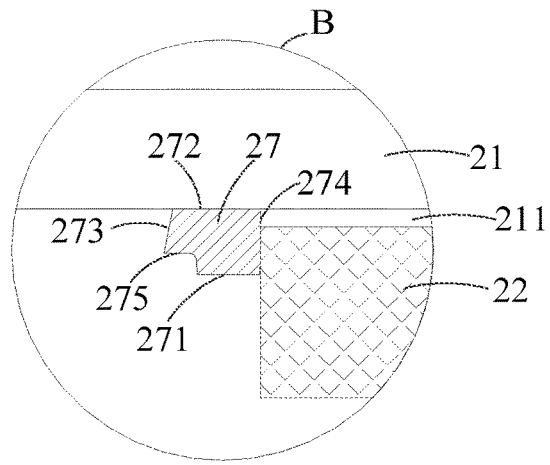
FIG. 17 is a partially enlarged diagram of the terminal display assembly of FIG. 16 at B position.

FIG. 16 is another cross-sectional diagram of the terminal display assembly of FIG. 4 in the P-P direction. FIG. 17 is a partially enlarged diagram of the terminal display assembly of FIG. 16 at B position. As shown in FIGS. 16-17, the seal ring 27 may include a placement stand 275 located at the top 271 of the seal ring 27. Therein, the placement stand 275 may be formed on the inner wall 273 of the seal ring 27. It should be noted that the placement stand 275 may also be formed on the outer wall 274 of the seal ring 27.

In the actual production and processing procedures, a glue can be dispensed at an area of the display screen 22 corresponding to the position of the through hole 221 to form a ring of silica gel between the display screen 22 and the light-transmission cover plate 21. After being cured, the silica gel can finally form the seal ring 27 via compression molding.

Figure 18:
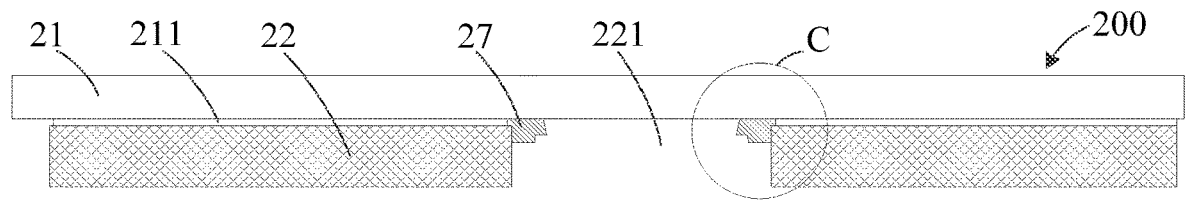
FIG. 18 is another cross-sectional diagram of the terminal display assembly of FIG. 4 in the P-P direction.
Figure 19:
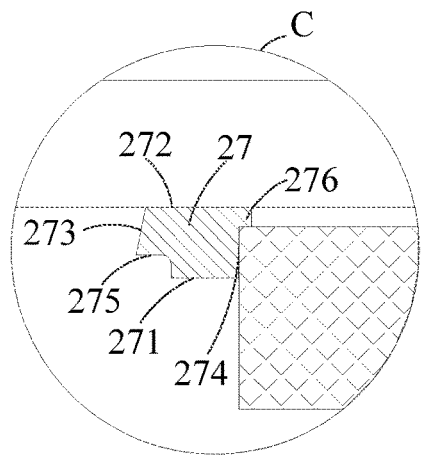
FIG. 19 is a partially enlarged diagram of the terminal display assembly of FIG. 18 at C position.

FIG. 18 is another cross-sectional diagram of the terminal display assembly of FIG. 4 in the P-P direction. FIG. 19 is a partially enlarged diagram of the terminal display assembly of FIG. 18 at C position. As shown in FIGS. 18-19, the seal ring 27 may include an extension 276 and a placement stand 275. Therein, the extension 276 may be referred to the extension 276 described above, and details are not described herein again. Therein, the placement stand 275 may be referred to the placement stand 275 described above, and details are not described herein again.

Figure 20:
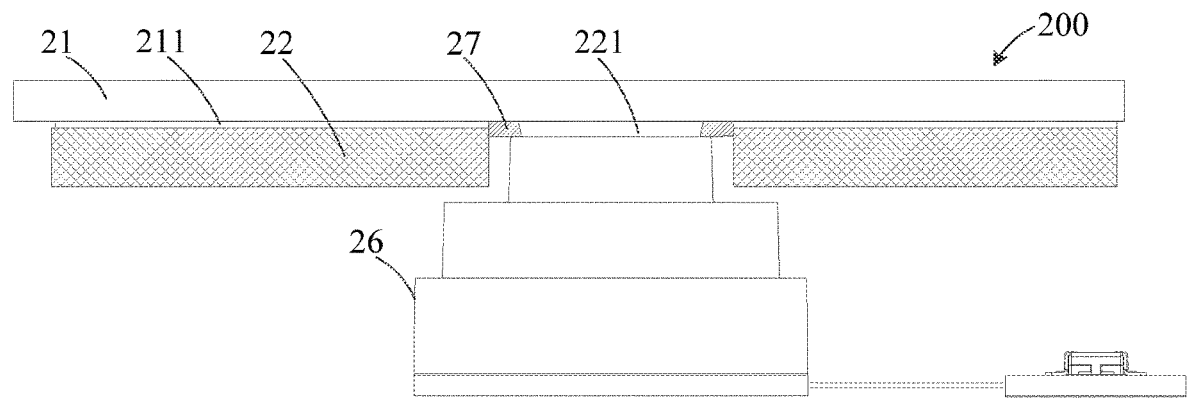
FIG. 20 is another cross-sectional diagram of the terminal display assembly of FIG. 4 in the P-P direction.
Figure 21:
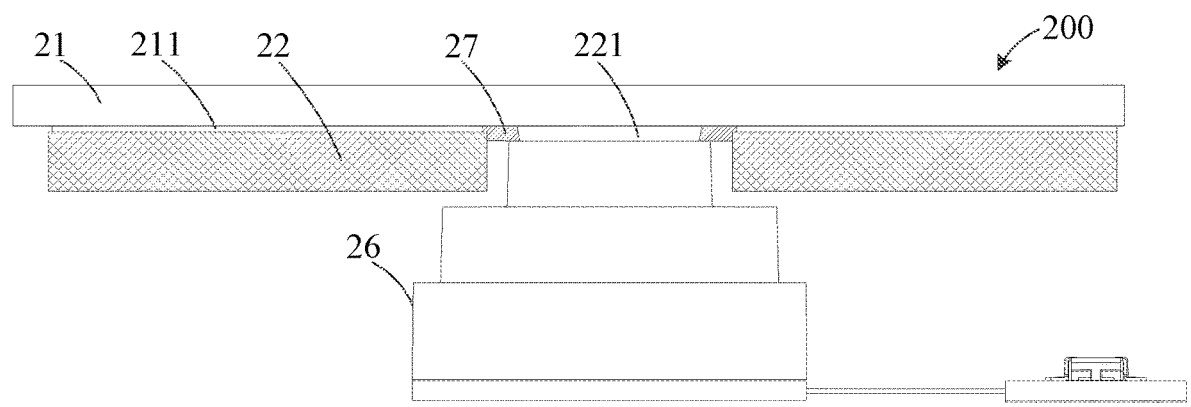
FIG. 21 is another cross-sectional diagram of the terminal display assembly of FIG. 4 in the P-P direction.

It should be noted that, in various solutions where the seal ring 27 is disposed between the display screen 22 and the light-transmission cover plate 21, when the camera is mounted in the through hole 221, the lens of the camera can be in contact with the top 271 of the seal ring 27. The camera and the top of the seal ring 27 can abut against each other. The seal ring 27 may function to prevent dust and light leakage. Specific details may refer to FIG. 20 and FIG. 21, wherein FIG. 20 is another cross-sectional diagram of the terminal display assembly of FIG. 4 in the P-P direction, and FIG. 21 is a further cross-sectional diagram of the terminal display assembly of FIG. 4 in the P-P direction.

Figure 22:
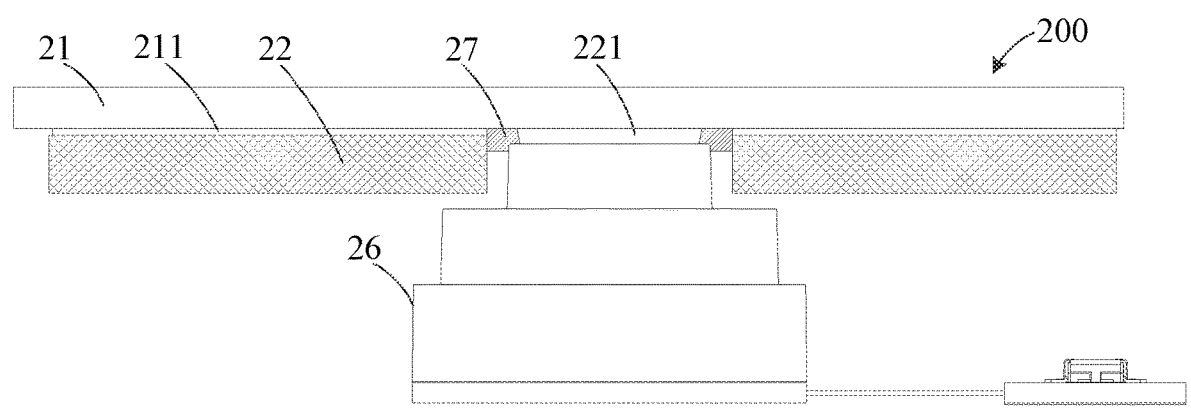
FIG. 22 is another cross-sectional diagram of the terminal display assembly of FIG. 4 in the P-P direction.
Figure 23:
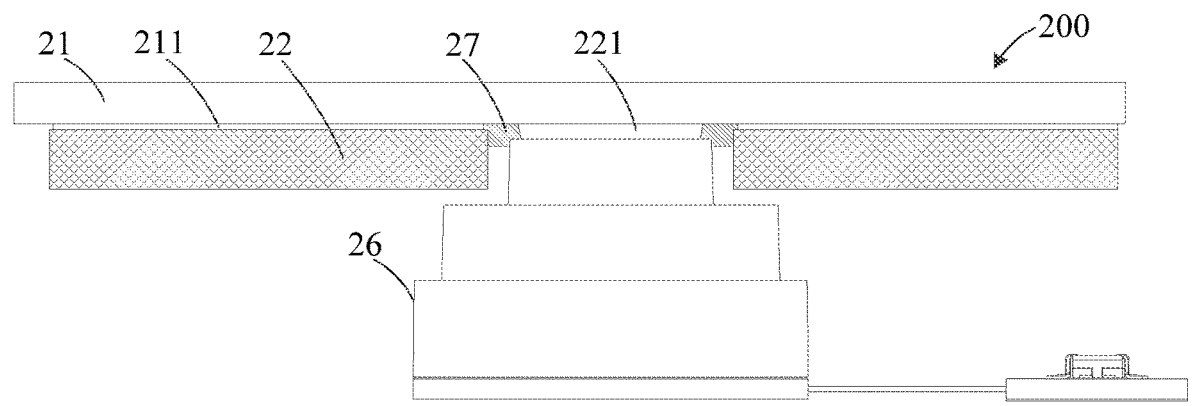
FIG. 23 is another cross-sectional diagram of the terminal display assembly of FIG. 4 in the P-P direction.

It should be further noted that, in various solutions where the seal ring 27 is disposed between the display screen 22 and the light-transmission cover plate 21, when the camera is mounted in the through hole 221, the lens of the camera can be in contact with the top 271 of the seal ring 27, and the camera and the top of the seal ring 27 may abut against each other. Moreover, the lens of the camera can be in contact with the placement stand 275, and abut against the placement stand 275. An end face of the lens can abut against the placement stand 275. The placement stand 275 may be adapted to the structure of the end face of the lens. The seal ring 27 may function to prevent dust and light leakage. Specifically, details may be referred to FIG. 22 and FIG. 23, wherein FIG. 22 is another cross-sectional diagram of the terminal display assembly of FIG. 4 in the P-P direction, and FIG. 23 is another cross-sectional diagram of the terminal display assembly of FIG. 4 in the P-P direction.

In the embodiments of the present disclosure described above, the display screen 22 defines the through hole 221 and the seal ring 27 is disposed between the light-transmission cover plate 21 and the display screen 22 to achieve dust-proof and light-shielding effects. It should be noted that manners in which the seal ring 27 achieves the dust-proof and light-shielding effects are not limited thereto.

Figure 24:
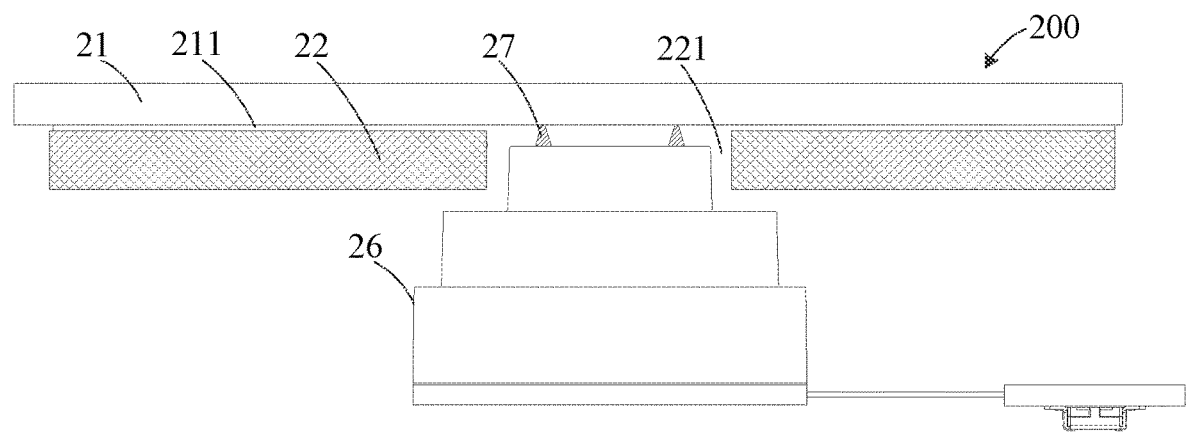
FIG. 24 is another cross-sectional diagram of the terminal display assembly of FIG. 4 in the P-P direction.
Figure 25:
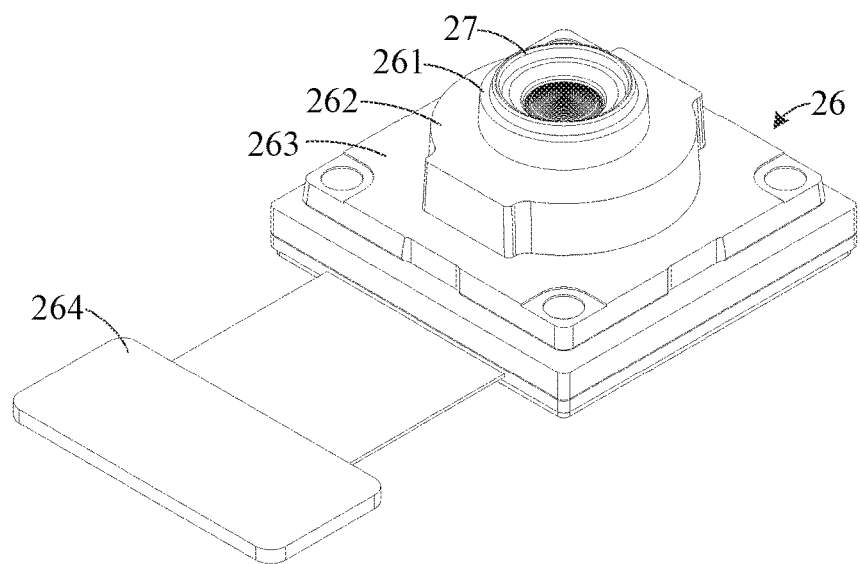
FIG. 25 is a structural diagram of a camera according to an embodiment of the present disclosure.

Referring to FIG. 24 which is another cross-sectional diagram of the terminal display assembly of FIG. 4 in the P-P direction, and FIG. 25 which is a structural diagram of the camera according to the embodiment of the present disclosure. The difference between the terminal display assembly 200 shown in FIG. 24 and the terminal display assembly 200 described above lies in that, the seal ring 27 of the terminal display assembly 200 shown in FIG. 24 can be disposed on the camera. Specifically, the seal ring 27 can be disposed on the lens of the camera. When the camera is mounted in the through hole 221, the seal ring 27 may be located between the light-transmission cover plate 21 and the lens, and the seal ring 27 may be in contact with the light-transmission cover plate 21.

In some embodiments, the height of the seal ring 27 may also be greater than or equal to the thickness of the optical adhesive 211, such that the seal ring 27 can achieve a light-shielding effect.

In some embodiments, the width of the seal ring 27 from the free end to the connecting end can be gradually increased. It should be noted that the structure of the seal ring 27 is not limited thereto, for example, the width of the seal ring 27 may also remain unchanged. In some embodiments, the outer diameter of the seal ring 27 may be less or greater than the outer diameter of the lens. Therein, the seal ring 27 may be fixed on the end face of the lens or fixed to the periphery of the lens by means of glue adhesion or hot-press molding.

It can be learned from the above that, the embodiment of the present disclosure may have a dust-proof function via the seal ring 27, and the seal ring 27 may block light rays of the display screen 22 at the position of the through hole 221, thereby achieving a light-shielding effect and preventing the light rays of the display screen 22 from entering the through hole 221. Accordingly, the optical means 26 (for example, camera) mounted at the position of the through hole 221 has a better performance in signal transmission. In addition, the material of the seal ring 27 in the embodiment of the present disclosure may be silica gel, which occupies relatively small space and may meet the requirement for the size of the through hole 221.

It should be noted that the structure of the display screen 22 is not limited thereto.

Figure 26:
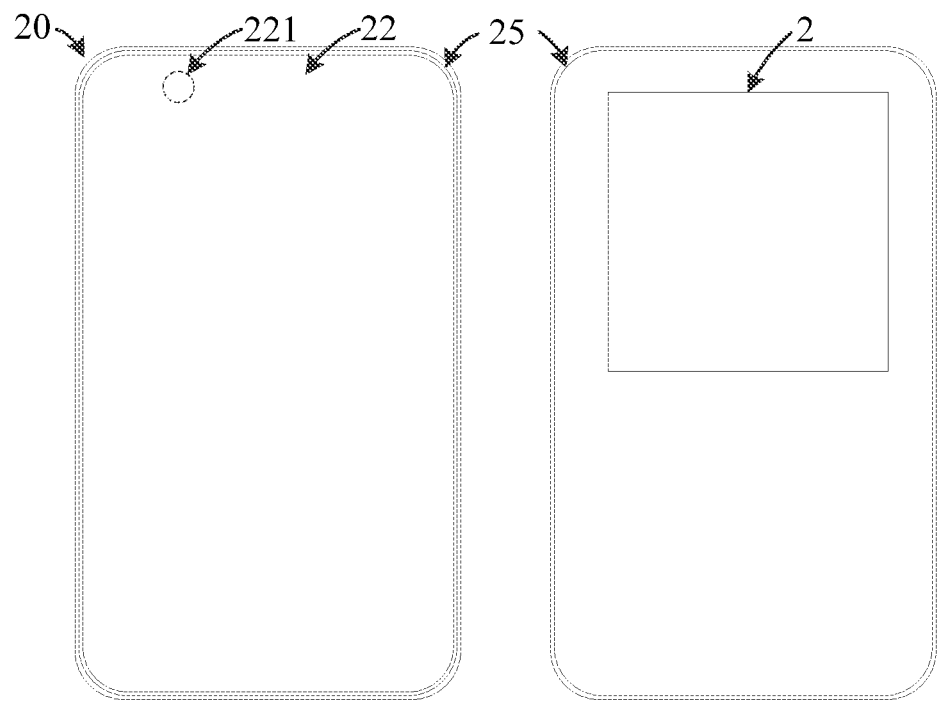
FIG. 26 is another structural diagram of a mobile terminal according to an embodiment of the present disclosure.

FIG. 26 is another structural diagram of a mobile terminal according to an embodiment of the present disclosure. The difference between mobile terminal 20 in this embodiment and the mobile terminal described above lies in that, the mobile terminal 20 in this embodiment may further include a first terminal display assembly 200 and a second terminal display assembly 2. As shown in FIG. 26, the first terminal display assembly 200 may be mounted on a face of the housing 25. The second terminal display assembly 2 may be mounted on the other face of the housing 25. The first terminal display assembly 200 and the second terminal display assembly 2 may be respectively disposed on opposite faces of the housing 25. In some embodiments, a display area of the first terminal display assembly 200 may be greater than that of the second terminal display assembly 2. In some embodiments, the first terminal display assembly 200 may define a through hole 221, and details may be referred to the terminal display assembly 200 described above. The second terminal display assembly 2 may include a display screen and a cover plate, which can be referred to above.

Figure 27:
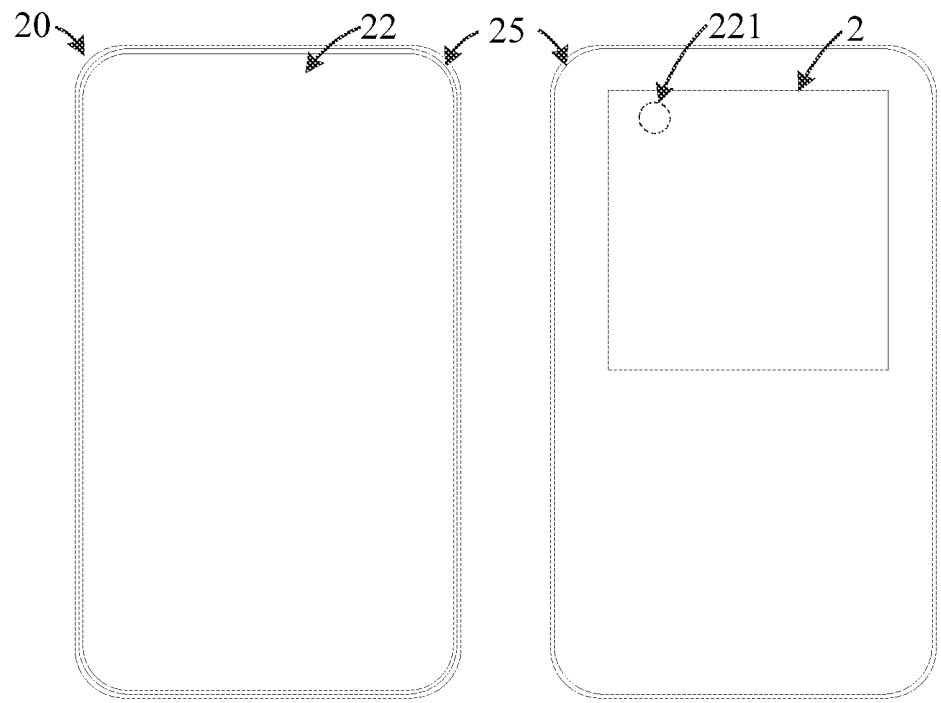
FIG. 27 is another structural diagram of a mobile terminal according to an embodiment of the present disclosure.

It should be noted that the second terminal display assembly 2 may also define a through hole 221. FIG. 27 is another structural diagram of a mobile terminal according to the embodiment of the present disclosure. The difference between mobile terminal 200 shown in FIG. 27 and the mobile terminal shown in FIG. 26 lies in that, the first terminal display assembly 200 does not define the through hole 221, and the second terminal display assembly 2 may define the through hole 221. The structure of the second terminal display assembly 2 may be referred to above, and details are not described herein again.

The terminal display assembly and the mobile terminal according to the embodiments of the present disclosure have been described above in details. The principles and embodying modes of the present disclosure have been illustrated with concrete examples. The description of the above embodiments is used only for facilitating understanding the present disclosure. Meanwhile, those skilled in the art could make modifications in both the embodiments and application scope on the basis of the idea of the present disclosure.

To sum up, the contents of the present disclosure should not be understood as limiting the present disclosure.

What is claimed is:

1. A terminal display assembly, comprising:
a display screen, defining a through hole penetrating the display screen in a thickness direction of the display screen;
a light-transmission cover plate disposed on the display screen and covering the through hole; and
an optical means, at least part of the optical means being disposed in the through hole; and
a seal ring disposed on the optical means, sandwiched between the optical means and the light-transmission cover plate, and contacting with the light-transmission cover plate;
wherein the seal ring comprises a top and a bottom opposite to the top, the top of the seal ring is disposed on the optical means; and
wherein the seal ring further comprises an outer wall, and an inner wall away from a sidewall of the display screen in the through hole and disposed opposite to the outer wall of the seal ring;
a placement stand is formed on the top, the placement stand is recessed from the top of the seal ring towards the bottom of the seal ring, and further connected to the inner wall.

2. The terminal display assembly according to claim 1, wherein the seal ring is made of a silica gel material; the seal ring is heated and pressed on the optical means, or the seal ring is adhered to the optical means by glue.

3. The terminal display assembly according to claim 1, wherein a width of the seal ring is gradually increased from the bottom to the top.

4. The terminal display assembly according to claim 1, wherein the seal ring is in shape of a circular annulus, and an inner diameter of the seal ring is gradually increased in a direction from the bottom to the top.

5. The terminal display assembly according to claim 1, wherein the light-transmission cover plate is fixed on the display screen via an optical adhesive, a thickness of the seal ring is greater than or equal to a thickness of the optical adhesive.

6. The terminal display assembly according to claim 1, wherein the optical means comprises a camera member having a base and a lens, the lens is disposed on the base and further received in the through hole, the seal ring is disposed on the lens.

7. The terminal display assembly according to claim 6, wherein the lens comprises an end face away from the base, the seal ring is disposed on the end face of the lens away from the base.

8. The terminal display assembly according to claim 7, wherein the seal ring is disposed on a periphery of the end face.

9. A mobile terminal, comprising:
a housing;
a first terminal display assembly disposed in the housing;
wherein the first terminal display assembly comprises:
a display screen, defining a through hole penetrating the display screen in a thickness direction of the display screen;
a light-transmission cover plate disposed on the display screen and covering the through hole; and
an optical means, at least part of the optical means being disposed in the through hole; and
a seal ring disposed on the optical means, sandwiched between the optical means and the light-transmission cover plate, and contacting with the light-transmission cover plate;
wherein the seal ring comprises a top and a bottom opposite to the top, the top of the seal ring is disposed on the optical means; and
wherein the seal ring further comprises an outer wall, and an inner wall away from a sidewall of the display screen in the through hole and disposed opposite to the outer wall of the seal ring;
a placement stand is formed on the top, the placement stand is recessed from the top of the seal ring towards the bottom of the seal ring, and further connected to the inner wall.

10. The mobile terminal according to claim 9, further comprising a second terminal display assembly disposed on the housing, the first terminal display assembly is disposed on a face of the housing, and the second terminal display assembly is disposed on an opposite face of the housing.

11. The mobile terminal according to claim 10, wherein a display area of the second terminal display assembly is greater than that of the first terminal display assembly.

12. The mobile terminal according to claim 9, wherein the seal ring is made of a silica gel material; the seal ring is heated and pressed on the optical means, or the seal ring is adhered to the optical means by glue.

13. The mobile terminal according to claim 9, wherein a width of the seal ring is gradually increased from the bottom to the top.

14. The mobile terminal according to claim 9, wherein the seal ring is in shape of a circular annulus, and an inner diameter of the seal ring is gradually increased in a direction from the bottom to the top.

15. The mobile terminal according to claim 9, wherein the light-transmission cover plate is fixed on the display screen via an optical adhesive, a thickness of the seal ring is greater than or equal to a thickness of the optical adhesive.

16. A terminal display assembly, comprising:
a display screen, defining a through hole penetrating the display screen in a thickness direction of the display screen;
a light-transmission cover plate disposed on the display screen and covering the through hole; and
an optical means, at least part of the optical means being disposed in the through hole; and
a seal ring disposed on the optical means, at least part of the seal ring is sandwiched between the optical means and the light-transmission cover plate;
wherein the seal ring comprises a top and a bottom opposite to the top, the top of the seal ring is disposed on the optical means; and
wherein the seal ring further comprises an outer wall, and an inner wall away from a sidewall of the display screen in the through hole and disposed opposite to the outer wall of the seal ring;
a placement stand is formed on the top, the placement stand is recessed from the top of the seal ring towards the bottom of the seal ring, and further connected to the inner wall.

17. The terminal display assembly according to claim 1, wherein the seal ring further comprises an extension located at a lateral side of the outer wall of the seal ring and extending in a direction from the inner wall of the seal ring toward the outer wall of the seal ring, and the extension extends into between the display screen and the light-transmission cover plate.

18. The terminal display assembly according to claim 17, wherein the light-transmission cover plate is fixed on the display screen via an optical adhesive;

the extension is connected to the optical adhesive, and a thickness of the extension is equal to that of the optical adhesive.

19. The mobile terminal according to claim 9, wherein the seal ring further comprises an extension located at a lateral side of the outer wall of the seal ring and extending in a direction from the inner wall of the seal ring toward the outer wall of the seal ring, and the extension extends into between the display screen and the light-transmission cover plate.

20. The mobile terminal according to claim 19, wherein the light-transmission cover plate is fixed on the display screen via an optical adhesive;

the extension is connected to the optical adhesive, and a thickness of the extension is equal to that of the optical adhesive.

\* \* \* \* \*